United States Patent
Lobban et al.

(10) Patent No.: US 8,429,238 B2
(45) Date of Patent: Apr. 23, 2013

(54) METHOD FOR PROVIDING FEEDBACK TO A PUBLISHER

(75) Inventors: Trevor Lobban, Hursley Park (GB); Jonathan Woodford, Hursley Park (GB); Morag Hughson, Hursley Park (GB); Hazel Fix, Hursley Park (GB)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 12/841,025

(22) Filed: Jul. 21, 2010

(65) Prior Publication Data

US 2011/0055339 A1  Mar. 3, 2011

(51) Int. Cl.
  *G06F 15/16* (2006.01)
(52) U.S. Cl.
  USPC ............. 709/206; 709/204; 705/8; 705/14; 705/26.35
(58) Field of Classification Search .............. 709/206; 705/8–14
  See application file for complete search history.

(56) References Cited

U.S. PATENT DOCUMENTS

| | | | |
|---|---|---|---|
| 7,865,550 B2 | 1/2011 | Lobban et al. | |
| 2003/0028451 A1* | 2/2003 | Ananian | 705/27 |
| 2003/0130894 A1* | 7/2003 | Huettner et al. | 705/14 |
| 2005/0027543 A1* | 2/2005 | Labrou et al. | 705/1 |
| 2005/0188039 A1* | 8/2005 | Charters et al. | 709/206 |
| 2006/0167897 A1* | 7/2006 | Jones et al. | 707/10 |
| 2007/0271142 A1* | 11/2007 | Coon | 705/14 |
| 2008/0126169 A1* | 5/2008 | Coon | 705/8 |
| 2008/0133541 A1* | 6/2008 | Fletcher et al. | 707/10 |
| 2008/0244025 A1* | 10/2008 | Ginis et al. | 709/206 |
| 2009/0037276 A1* | 2/2009 | Smith | 705/14 |
| 2009/0187635 A1* | 7/2009 | Lobban et al. | 709/206 |
| 2010/0023587 A1* | 1/2010 | Fletcher et al. | 709/206 |
| 2010/0162268 A1* | 6/2010 | Thomas et al. | 719/318 |
| 2010/0299140 A1* | 11/2010 | Witbrock et al. | 704/9 |
| 2010/0325013 A1* | 12/2010 | Ku | 705/26.35 |

* cited by examiner

*Primary Examiner* — Wing F Chan
*Assistant Examiner* — Razu Miah
(74) *Attorney, Agent, or Firm* — David Mims; Robert C. Rolnik

(57) ABSTRACT

A computer implemented method for providing feedback to a publisher, comprising: responsive to receiving a published message from the publisher comprising an option requesting feedback, comparing the message with subscriber data; and responsive to the publish operation and responsive to determining a matching subscriber associated with the published message, selecting a notification for transmission to the publisher.

6 Claims, 3 Drawing Sheets

METHOD FOR PROVIDING FEEDBACK TO A PUBLISHER

FOREIGN APPLICATION PRIORITY DATA

This application claims benefit of priority of Foreign Patent Application No. GB 09168619.6, filed in the United Kingdom on Aug. 25, 2009, which is herein incorporated by reference.

BACKGROUND OF THE INVENTION

1. Field of the Invention

The present invention relates generally to an apparatus for providing feedback to a publisher.

2. Description of the Related Art

Publish and Subscribe (pub/sub) is an effective way of disseminating information to multiple users. Pub/Sub applications can help to simplify the task of getting business messages and transactions to a wide, dynamically changing, and potentially large audience in a timely manner.

In a pub/sub system, publishers are typically not concerned with where their messages are going, and subscribers are not interested in where the messages they receive have come from. The publishers and subscribers are loosely coupled, in that no state is shared between them. Instead, a "broker" typically assures the integrity of the message source and manages the distribution of a message according to subscriptions registered at the broker.

Message topic strings typically provide the key to the delivery of messages between publishers and subscribers. With reference to a pub/sub system 100 as shown in FIG. 1, instead of including a specific destination address in each message, a publisher 105 assigns a topic string to a message. A broker 110 comprises a matching engine 115 for matching a topic string of a published message with a list of subscribers 120 and 125 who have subscribed to receive messages that are published to that topic string. In response to a match, the broker 110 sends the published message to the subscribers 120 and 125.

SUMMARY OF THE INVENTION

According to a first aspect, there is provided an apparatus for providing feedback to a publisher, comprising: means, responsive to receiving a published message from the publisher comprising an option requesting feedback, for comparing the message with subscriber data; and means, responsive to the publish operation and responsive to determining a matching subscriber associated with the published message, for selecting a notification for transmission to the publisher.

According to a second aspect, there is provided a method for providing feedback to a publisher, comprising: comparing, in response to receiving a published message from the publisher comprising an option requesting feedback, the message with subscriber data; and selecting, in response to the publish operation and responsive to determining a matching subscriber associated with the published message, a notification for transmission to the publisher.

According to a third aspect, there is provided a computer program comprising program code means adapted to perform all the steps of the method above when the program is run on a computer.

Note that the concept of a publisher requiring information about subscribers is atypical in a publish/subscribe environment.

BRIEF DESCRIPTION OF THE DRAWINGS

The present invention will now be described, by way of example only, with reference to preferred embodiments thereof, as illustrated in the following drawings.

DETAILED DESCRIPTION OF THE PREFERRED EMBODIMENT

In some cases, it is desirable for a publisher to obtain information associated with subscribers. A solution to this problem is for the publisher to query a broker in order to determine whether there are any subscribers on the topic to which it is going to publish. However this query is burdensome and can return only generic information.

Figure 1:
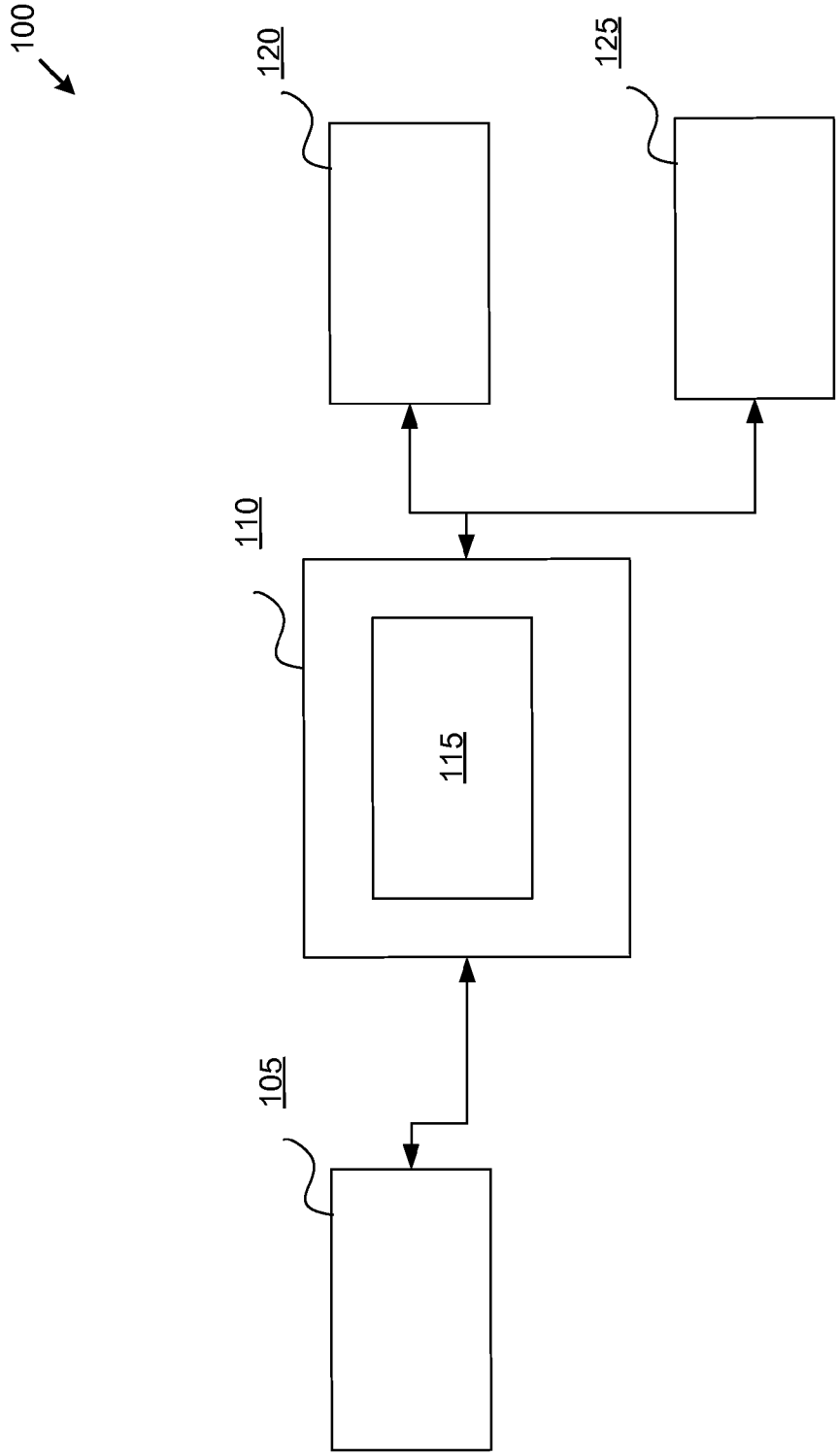
FIG. 1 depicts a block diagram of a prior art pub/sub system.
Figure 2:
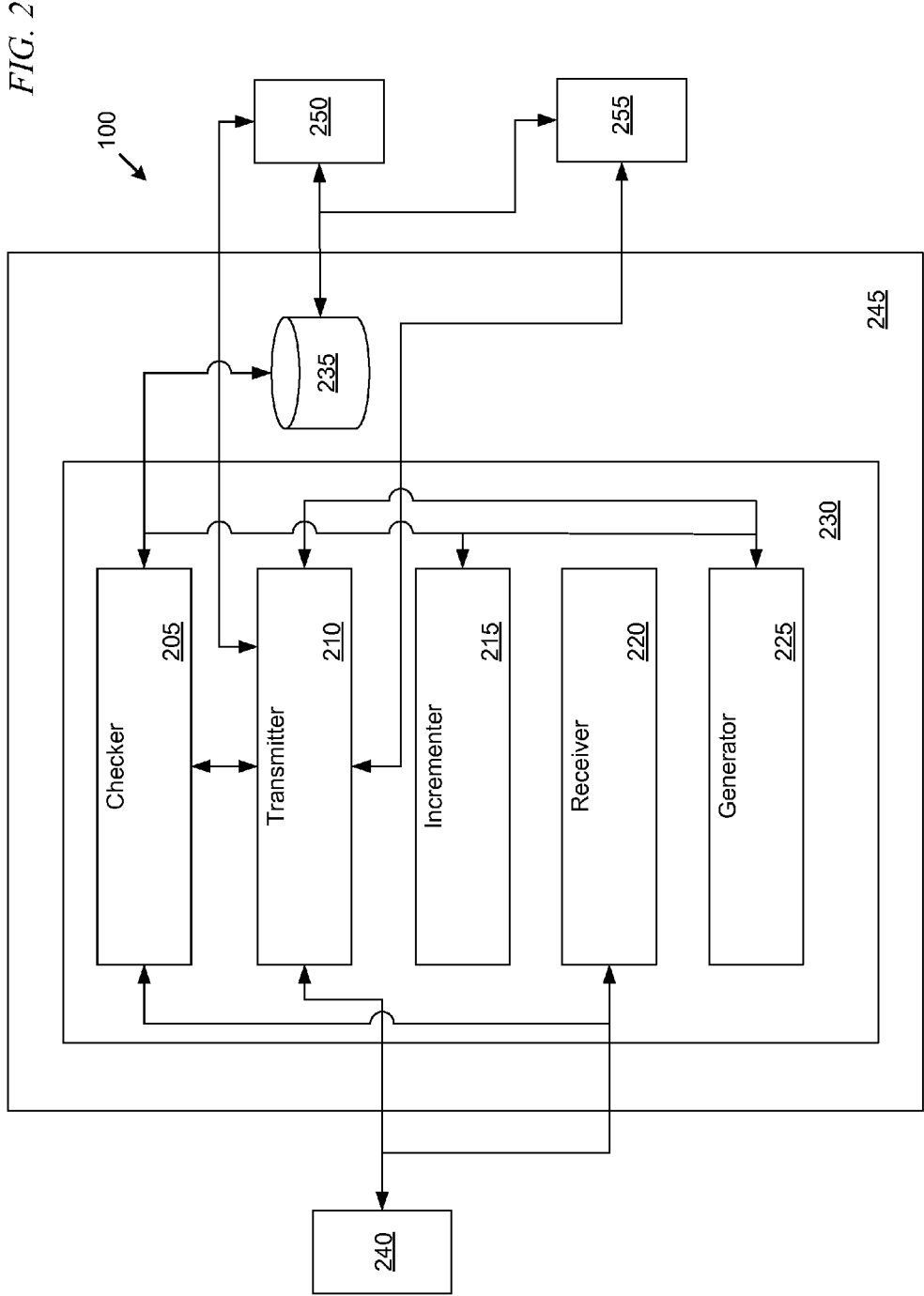
FIG. 2 depicts a block diagram of an apparatus of the preferred embodiment, operable to be used with the pub/sub system of FIG. 1.

FIG. 2 depicts a pub/sub system 200 comprising a publisher 240; a broker 245; a first subscriber 250; and a second subscriber 255.

FIG. 2 also comprises an apparatus 230 according to the preferred embodiment which is preferably associated with the broker 245. The apparatus comprises a checker 205; a transmitter 210; an incrementer 215; a receiver 220; and a generator 225.

Figure 3:
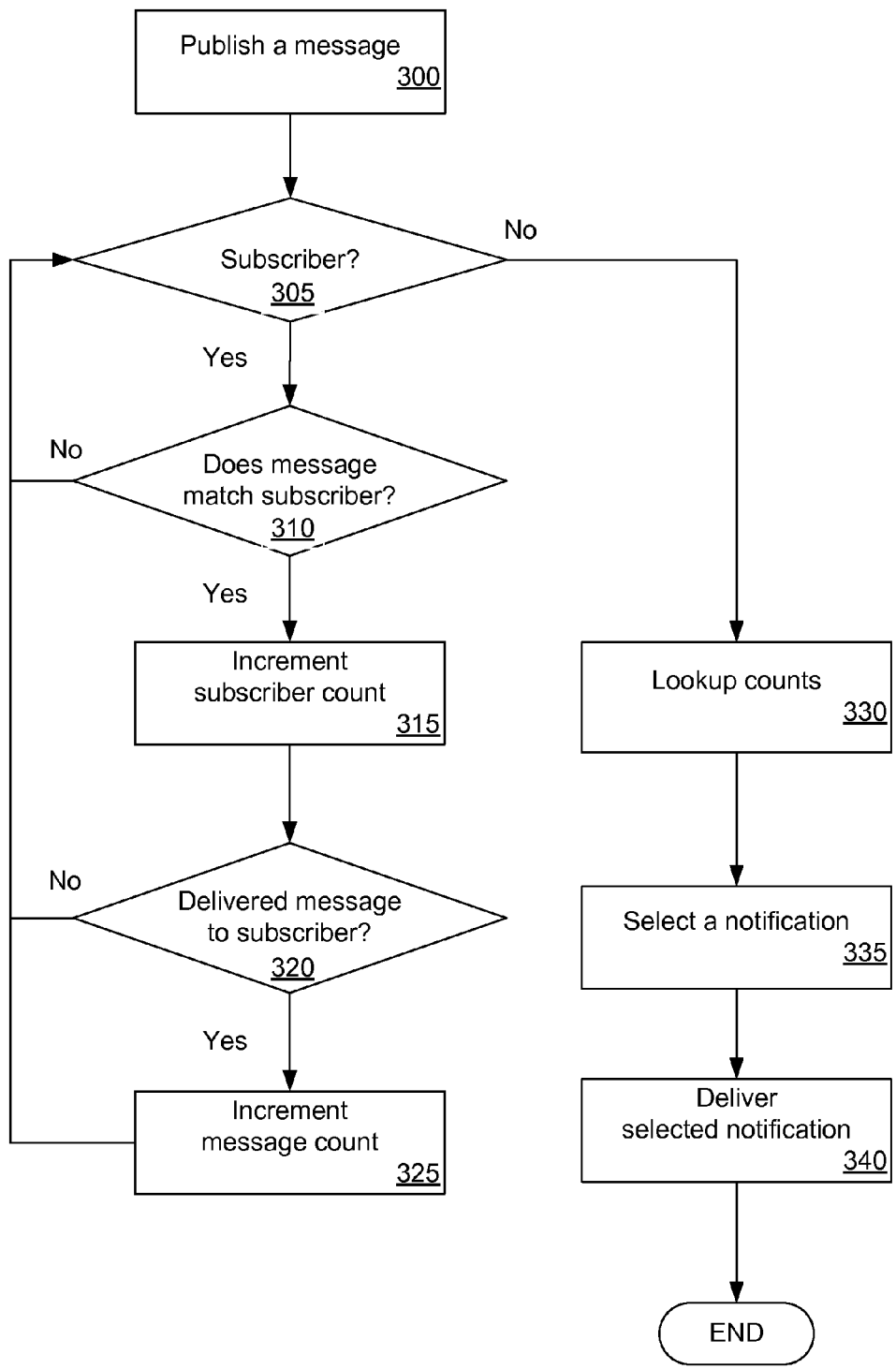
FIG. 3 is a flow chart depicting the operational steps involved in a process according to the preferred embodiment.

The process of the preferred embodiment will now be described with reference to FIGS. 2 and 3.

Firstly, the publisher 240 generates a message for publication. Preferably, the publisher 240 is modified to be operable to add at least one option to the message. In the example herein, the options comprise:

WARN_IF_NO_SUBSCRIBERS_MATCHED.
WARN_IF_NO_MESSAGES_DELIVERED

In the example herein, the publisher 240 adds each of the options, namely "WARN_IF_NO_SUBSCRIBERS_MATCHED" and "WARN_IF_NO_MESSAGES_DELIVERED", to the message.

In the example herein, the message also comprises a topic string and data.

At step 300, the publisher 240 publishes the message.

The message is received by the receiver 220. The receiver 220 passes the message to the checker 205. The checker 205 checks the message to determine whether any options have been selected by the publisher 240. In the example herein, the checker 205 determines that two options, namely "WARN_IF_NO_SUBSCRIBERS_MATCHED" and "WARN_IF_NO_MESSAGES_DELIVERED" have been selected.

The checker 205 extracts the topic string from the message and compares it against subscriber data 235 in order to check (step 305) whether there is a subscriber that has subscribed to the extracted topic string.

In the example, the checker 205 determines that there is a matching subscriber (e.g., the first subscriber 250).

At step 310, although there is a matching subscriber, preferably, the checker 205 carries out a further check in order to determine whether the message should be delivered to the matching subscriber.

This further check is required because, for example, a subscriber can be operable to select one or more filter options which the broker can apply to published messages. Subsequently, the subscriber may not receive a message even if the subscriber matches the topic string of the message.

For example, a subscriber can specify a filter option such that the subscriber only receives messages having a priority level of e.g., "5" or higher.

The filter options for a subscriber can be logged at the broker with the other subscriber data 235.

In the preferred embodiment, the checker 205 executes the check by comparing the message (e.g., message payload) against the filter options held at the broker.

If the checker 205 determines that the message should not be delivered to the first subscriber 250, control passes to step 305.

In the example herein, the checker 205 determines that the message should be delivered to the first subscriber 250.

In response, the incrementer 215 increments (step 315) a count associated with subscribers. The resulting count is equal to one (1).

Control passes to the transmitter 210, which attempts to transmit the message to the first subscriber 250.

More specifically, the transmitter 210 attempts to transmit the message by using a put operation to put the message to a message queue of the first subscriber 250. If the put operation is successful, the first subscriber 250 is subsequently able to retrieve the message from its queue using a get operation.

Note that the put operation may fail (e.g., a connection with the message queue may be lost such that the message can not be placed on the message queue; the subscriber's message queue may be full) after which the message can be placed on a dead letter queue or discarded.

At step 320, the checker 205 determines whether the message has been delivered to the first subscriber, for example, by analyzing a return code associated with the put operation.

If the checker 205 determines that the message has not been delivered to the first subscriber 250, control passes to step 305.

In the example herein, at step 330, the checker 205 determines that the put operation is successful, for example, by analyzing a return code associated with the put operation.

Responsively, at step 325, the incrementer 215 increments a count of messages delivered. The resulting count is equal to one (1).

Note that if, for example, a publisher specifies only the option of "WARN_IF_NO_SUBSCRIBERS_MATCHED", further analysis associated with whether a message was delivered (step 320 and 325) is not executed. Rather, control passes to step 305.

Continuing with the example, control passes to step 305 where the checker 205 checks whether there is another subscriber that has subscribed to the extracted topic string.

In the example, the checker 205 determines that there is another matching subscriber (e.g., the second subscriber 255).

At step 310, the checker 205 carries out a further check in order to determine whether the message should be delivered to the matching subscriber.

In the example herein, the checker 205 determines that the message should be delivered to the second subscriber 255.

In response, the incrementer 215 increments (step 315) a count associated with subscribers. The resulting count is equal to two (2).

Control passes to the transmitter 210, which attempts to transmit the message to the second subscriber 255.

More specifically, the transmitter 210 attempts to transmit the message by using a put operation to put the message to a message queue of the second subscriber 255.

In the example herein, at step 320, the checker 205 determines that the put operation is successful.

Responsively, at step 325, the incrementer 215 increments a count of messages delivered. The resulting count is equal to two (2).

Continuing the example, control passes to step 305 where the checker 205 checks whether there is another subscriber that has subscribed to the extracted topic string.

In the example, the checker 205 determines that there is not another subscriber.

Responsively, control passes to step 330 where the checker 205 accesses data associated with a count and reads a value associated with the count.

In the example herein, the checker 205 accesses the subscriber count and determines that the value is two (2). Furthermore, the checker 205 accesses the delivered message count and determines that the value is two (2).

In response, at step 335, the checker 205 accesses one or more notifications in order to select a notification.

In the example herein, preferably, one or more notifications are generated by the generator 225 in a pre-processing step.

Preferably, the generator 225 generates the following notifications:

1) "WARNING: NO SUBSCRIBERS MATCHED"
2) "WARNING: NO MESSAGE DELIVERED"
3) SUCCESS

Preferably the checker 205 is configured to select the first notification if the publisher 240 has selected only the "WARN_IF_NO_SUBSCRIBERS_MATCHED" option and if, in response to step 330, the checker 205 determines that the subscriber count is equal to zero (0).

Preferably the checker 205 is configured to select the second notification if the publisher 240 has selected both the "WARN_IF_NO_SUBSCRIBERS_MATCHED" option and the "WARN_IF_NO_MESSAGES_DELIVERED" option and if, in response to step 330, the checker 205 determines that the delivered message count is equal to zero (0).

Preferably the checker 205 is configured to select the third notification if the publisher 240 has selected only the "WARN_IF_NO_SUBSCRIBERS_MATCHED" option and if, in response to step 330, the checker 205 determines that the subscriber count is equal to one (1) or more than one (1) or if the publisher 240 has selected both the "WARN_IF_NO_SUBSCRIBERS_MATCHED" option and the "WARN_IF_NO_MESSAGES_DELIVERED" option and if in response to step 330, the checker 205 determines that the delivered message count is equal to one (1) or more than one (1).

In the example herein, in response to the publisher 240 selecting both the "WARN_IF_NO_SUBSCRIBERS_MATCHED" option and the "WARN_IF_NO_MESSAGES_DELIVERED" option and in response to step 330 where the checker 205 determined that the delivered message count is equal to two (2), the checker selects (step 335) the third notification.

In response, at step 340, the transmitter 210 transmits the third notification to the publisher 240.

Preferably, a notification is generated as a return code which is subsequently transmitted in response to the publish operation from the publisher 240 after which the process ends.

Note that generation and transmission of a return code is far less expensive than generating a further message (for example, the latter requires the use of getting/putting operations and administration associated with one or more queues). Furthermore, the transmission of a return code is a synchronous operation in response to a publish operation which is fairly quick to complete. This is advantageous as the publisher can get fairly immediate feedback on the publish operation.

Advantageously, the publisher 240 can use such notifications to modify its behavior. For example, if the publisher 240 receives the first notification, a publisher 240 may wish to take action when it discovers that there are no subscribers to message it has published. For example, the publisher 240 can stop publishing messages on that particular topic. This may be particularly useful if, for example, the messages contain sensitive/confidential data because by proactively preventing the publishing of such messages using the network, the risk of a third party obtaining the content is very much reduced.

In another example, if the publisher 240 receives the second notification, a publisher 240 may wish to take action if it discovers that a message was not delivered in response to the publish operation. For example, the publisher 240 may choose to not wait for any responses to the message that the publisher 240 published. The finer grained information associated with whether a message was actually delivered, (for example, when compared with the information associated with whether a matching subscriber is available), allows for extra flexibility at the publisher 240.

Advantageously, the present invention allows the provision of tailored feedback in response to a publish operation, accurately notifying the publisher, for example, if no subscribers match the publication message. Further, advantageously, the publisher is able to be informed in the event that a matching subscriber did not get a message.

Preferably, further feedback can be provided in response to one or more of the following events.

For example, feedback notifying the publisher that a matching subscriber exists can be provided if a routing exit that suppresses delivery of the message to a matching subscriber has been defined.

In another example, if a publisher has elected to invoke an option to "retain" messages (e.g., where the last message published on a topic is retained at the broker and delivered to any subsequently determined matching subscribers), feedback notifying the publisher that a matching subscriber does not exist can be provided if there is no matching subscriber for the message. However, note that a matching subscriber may subsequently connect to the broker and receive the retained message.

In yet another example, feedback notifying the publisher that a particular matching subscriber does not exist can be provided if the publisher associated with a publish operation is also a subscriber and has elected not to receive its own published messages.

The present invention can advantageously be applied in a number of real world applications.

In a first application, a requester publishes a message on a topic (e.g., "/insurance/quotation/make_a/model_b/year_of_manufacture_c/requester_age_d") in order to get a quote for insuring a car (wherein the car has a make "a"; model "b" and was manufactured in year "c" and wherein the requester has an age "d"). Further data may be included in the message (e.g., how long the requester has held a driving license).

Insurance providers subscribe to the/insurance/quotation root topic (or to sub-topics) in order to receive publication messages requesting insurance quotes. Upon receiving such a publication message, an insurance provider can reply to the requester with an insurance quotation.

It should be understood that in prior art systems, upon publishing a massage, the requester has no knowledge of how many responses they will get and they must wait for responses to be delivered. Even if there are no subscribers, the requester has no option but to wait before eventually deciding that no responses may be returned.

By using the present invention, if there are no subscribers that match the published message, the requester is given immediate feedback, in response to the publish operation, that there are no subscribers. Note that the topic string in the example above is quite detailed and complex. Advantageously, the present invention is able to immediately give feedback that, e.g., there are no insurance providers available to service an insurance quote for the particular car (make, model and year of manufacture) and requester age.

In a second application, sensors publish messages associated with, for example, temperature readings. In an example, the sensors can publish messages periodically throughout the day and the data they publish can be monitored by an onsite monitoring team who register as subscribers.

The present invention can be invoked, for example, when a temperature reading being published has a value that is e.g., above a configured threshold.

If a message containing a temperature reading that is above the configured threshold is published by a sensor and if there are no matching subscribers (and thus, no one is monitoring the sensor), the sensor can modify its behavior. For example, the sensor can re-publish the message (e.g., on a different topic) to ensure that it is received or the sensor can invoke an alarm.

This is advantageous because, for example, in the case where a temperature reading having a value that is above a configured threshold has been published, there may be dangers associated with the onsite environment (e.g., fire). In this case, it may be important for at least one of the monitoring team to receive the message. By giving the sensor immediate feedback that, for example, there are no subscribers, behavior can be implemented in order to take escalation actions.

It should be understood that the generation and the transmission of messages are being seen as expensive operations in certain environments and there are desires to ensure that efficiency is improved. With that in mind, in a third application, a sensor publishes a message, for example, every five seconds. The present invention can be used by the sensor in order to determine whether there are any matching subscribers. If the sensor discovers that there are no subscribers, the sensor can modify its behavior, e.g., the sensor publishes messages at a thirty-second frequency, thereby reducing the burden on the network.

Advantageously, if the present invention is invoked at regular periods and if the sensor later discovers that there is a subscriber, it can modify its behavior again, and e.g., it can increase the frequency at which it publishes messages to five seconds.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the Figures), and that the software may be provided in the form of one or more computer program elements carried on any suitable data-carrier (also not shown in the Figures) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, the preferred embodiment of the present invention may be realized in the form of computer implemented method of deploying a service comprising steps of deploying computer program code operable to, when deployed into a computer infrastructure and executed thereon, cause the computer system to perform all the steps of the described method.

It will be clear to one skilled in the art that many improvements and modifications can be made to the foregoing exemplary embodiment without departing from the scope of the present invention.

What is claimed is:

1. A computer implemented method for providing feedback to a publisher, comprising:
    comparing, in response to receiving a published message from the publisher comprising an option, the message with subscriber data;
    selecting, in response to a publish operation and responsive to determining a matching subscriber associated with the published message, a notification for transmission to the publisher;
    receiving a published message from the publisher comprising the option;
    responsive to determining the matching subscriber, incrementing a first count associated with matching subscribers;
    checking to determine that the message is to be sent to the matching subscriber, the checking based on whether at least one option is selected;
    responsive to determining that the message is to be sent to the matching subscriber, incrementing the first count;
    responsive to transmitting the message to the matching subscriber, checking whether the message has been delivered to the matching subscriber; and
    responsive to determining that the message has been delivered to the matching subscriber, incrementing a second count associated with delivered messages.

2. A computer implemented method for providing feedback to a publisher, comprising:
    comparing, in response to receiving a published message from the publisher comprising an option, the message with subscriber data;
    selecting, in response to a publish operation and responsive to determining a matching subscriber associated with the published message, a notification for transmission to the publisher;
    receiving a published message from the publisher comprising the option;
    responsive to determining the matching subscriber, incrementing a first count associated with matching subscribers;
    checking to determine that the message is to be sent to the matching subscriber, the checking based on whether at least one option is selected;
    responsive to determining that the message is to be sent to the matching subscriber, incrementing the first count;
    responsive to transmitting the message to the matching subscriber, checking whether the message has been delivered to the matching subscriber;
    responsive to determining that the message has been delivered to the matching subscriber, incrementing a second count associated with delivered messages;
    reading at least one of the first count and the second count;
    accessing a set of notifications; and
    using at least one of the first count and the second count to select a notification.

3. The computer implemented method of claim 2, further comprising:
    checking one or more options specified by the publisher in order to select a notification.

4. The computer implemented method of claim 2, further comprising:
    transmitting the selected notification to the publisher as a return code to the publish operation.

5. The computer implemented method of claim 2, further comprising:
    causing the publisher to modify its behavior in response to receiving the selected notification.

6. The computer implemented method of claim 2, wherein the option comprises a threshold value associated with the message.

* * * * *